(12) United States Patent
Liu et al.

(10) Patent No.: US 8,430,314 B1
(45) Date of Patent: Apr. 30, 2013

(54) APPARATUS FOR AND METHOD OF ALIGNING NON-ROTATIONALLY SYMMETRICAL IMAGING LENS APERTURE WITH AN IMAGING SENSOR IN AN IMAGING READER

(75) Inventors: Rong Liu, Centereach, NY (US); David Tsi-Shi, Stony Brook, NY (US); Jean Tu, Stony Brook, NY (US); Michael Veksland, Mount Laurel, NJ (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/295,406

(22) Filed: Nov. 14, 2011

(51) Int. Cl.
*G06K 7/10* (2006.01)

(52) U.S. Cl.
USPC .......................................................... 235/454

(58) Field of Classification Search .................. 235/454, 235/462.01–462.49
See application file for complete search history.

(56) References Cited

U.S. PATENT DOCUMENTS

2006/0016892 A1* 1/2006 Vinogradov et al. ......... 235/454

* cited by examiner

Primary Examiner — Daniel Hess

(57) ABSTRACT

An apparatus and method for imaging a target, includes a housing having a presentation area, a solid-state imaging sensor having an imaging array of image sensors looking at a field of view that extends through the presentation area to the target, and an imaging lens assembly for capturing return light over the field of view from the target through the presentation area, and for projecting the captured return light onto the imaging array during imaging of the target. The assembly has a plurality of lenses, an aperture stop, and a holder for holding the lenses and the aperture stop in spaced relation along an optical axis. The aperture stop has a non-rotationally symmetrical aperture through which the optical axis extends. Alignment elements on the imaging lens assembly are used to align the non-rotationally symmetrical aperture with the imaging array.

14 Claims, 6 Drawing Sheets

APPARATUS FOR AND METHOD OF ALIGNING NON-ROTATIONALLY SYMMETRICAL IMAGING LENS APERTURE WITH AN IMAGING SENSOR IN AN IMAGING READER

FIELD OF THE DISCLOSURE

The present disclosure relates generally to an apparatus for, and a method of, reading targets by image capture and, more particularly, to aligning a non-rotationally symmetrical aperture of an imaging lens assembly with an imaging sensor in an imaging reader.

BACKGROUND

Solid-state imaging apparatus or imaging readers, that have been configured either as handheld, portable scanners and/or stand-mounted, stationary scanners each having a presentation window, or as vertical slot scanners each having a generally vertically arranged, upright window, or as flat-bed or horizontal slot scanners each having a generally horizontally arranged window, or as bi-optical, dual window scanners each having both generally horizontally and vertically arranged windows, have been used in many venues, such as supermarkets, department stores, and other kinds of retailers, libraries, parcel deliveries, as well as factories, warehouses and other kinds of industrial settings, for many years, in both handheld and hands-free modes of operation, to electro-optically read by image capture a plurality of symbol targets, such as one-dimensional symbols, particularly Universal Product Code (UPC) bar code symbols, and two-dimensional symbols, as well as non-symbol targets, such as driver's licenses, receipts, signatures, etc., the targets being associated with, or borne by, objects or products to be processed by the imaging readers. In the handheld mode, a user, such as an operator or a customer, held the imaging reader and manually aimed a window thereon at the target. In the hands-free mode, the user slid or swiped a product associated with, or bearing, the target in a moving direction across and past a respective window in a swipe mode, or momentarily presented the target associated with, or borne by, the product to an approximate central region of the respective window, and steadily momentarily held the target in front of the respective window, in a presentation mode. The choice depended on the type of the reader, or on the user's preference, or on the layout of the venue, or on the type of the product and target.

The imaging reader included a solid-state imager (also known as an imaging sensor) with a sensor array of photocells or light sensors (also known as pixels), which corresponded to image elements or pixels over a field of view of the imaging sensor, and an imaging lens assembly for capturing return light scattered and/or reflected from a target being imaged over a working range of distances, and for projecting the return light onto the imaging sensor to initiate capture of an image of the target as pixel data. The imaging sensor was configured as a one- or two-dimensional charge coupled device (CCD) or a complementary metal oxide semiconductor (CMOS) device, and included associated circuits for producing and processing an electrical signal corresponding to a one- or two-dimensional array of the pixel data over the field of view. The imaging sensor was controlled by a controller or programmed microprocessor that was operative for processing the electrical signal into data indicative of the target being imaged and, when the target was a symbol, for processing and decoding the symbol.

The known imaging lens assembly typically comprised a plurality of lenses of different sizes and optical powers. The lenses were made of glass or plastic, were held in a lens holder and were arranged along an optical axis. Since glass, as compared to plastic, had a relatively lower coefficient of thermal expansion and a relatively lower refractive index variation over temperature, it was sometimes preferred to make each lens of glass, rather than plastic, especially when it was desired to minimize focal shift over a wide operating temperature range. At other times, e.g., when the thermal instability and focal shift were not so critical in a particular application, it was preferred to make each lens of plastic, because a plastic lens is lighter than a corresponding glass lens and can be more easily and more inexpensively fabricated by molding, rather than machining and polishing. At still other times, a part-plastic, part-glass, hybrid lens design, in which at least one of the lenses was made of glass, e.g., for thermal stability, and at least another of the lenses was made of plastic, e.g., for lighter weight and ease of manufacture, was preferred to achieve the advantages of both glass and plastic.

The known imaging lens assembly also typically comprised an aperture stop having a rotationally symmetrical aperture, e.g., a circular aperture, on the optical axis. Alignment between the circular aperture and the imaging sensor was not critical, because the angular orientation of the circular aperture about the optical axis did not adversely affect optical imaging performance. However, in some applications, a non-rotationally symmetrical (or asymmetrical) aperture, e.g., a rectangular or elliptical aperture, was desired for an improved signal-to-noise ratio of the electrical signal, an extended range of the working distances, and a more reliable and responsive imaging reader performance, especially when using a one-dimensional, linear imaging sensor. In that event, the non-rotationally symmetrical aperture needed to be aligned with the linear imaging sensor. Specifically, the longer dimension of the non-rotationally symmetrical aperture needed to be positioned so that it extended along a direction generally perpendicular to the elongation of the linear imaging sensor. However, the known imaging lens assembly provided very little design flexibility in implementing such alignment between the non-rotationally symmetrical aperture and the linear imaging sensor. Without such alignment, the optical imaging performance characteristics of the imaging lens assembly were not fully realized.

Accordingly, it would be desirable to facilitate alignment between a non-rotationally symmetrical aperture of an imaging lens assembly and an imaging sensor, especially a linear imaging sensor, without sacrificing optical imaging performance.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
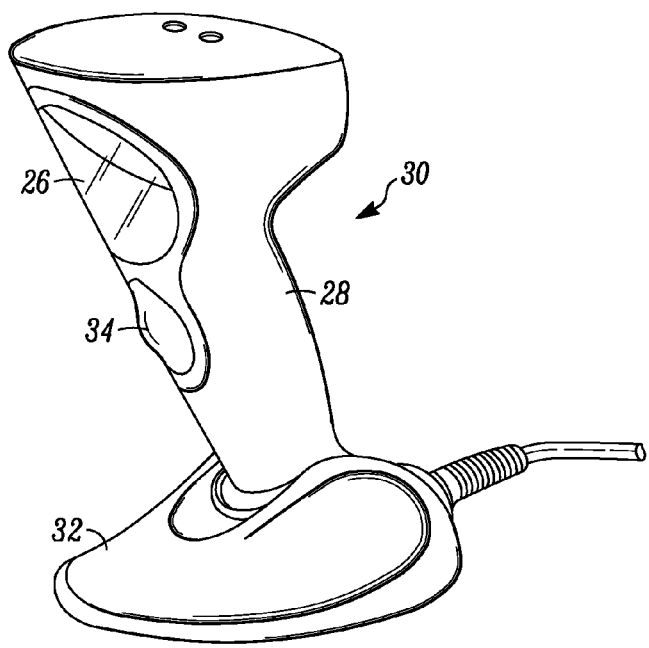
FIG. 1 is a perspective view of a portable imaging apparatus or reader operative in either a handheld mode, or a hands-free mode, for capturing return light from targets.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An apparatus or reader, in accordance with one feature of this invention, for imaging a target, comprises a housing having a presentation area (or window), a solid-state imaging sensor supported by the housing and including an imaging array of image sensors looking at a field of view that extends through the presentation area to the target, and an imaging lens assembly supported by the housing, for capturing return light over the field of view from the target through the presentation area, and for projecting the captured return light onto the imaging array during imaging of the target. The assembly includes a plurality of lenses, an aperture stop, and a holder for holding the lenses and the aperture stop in spaced relation along an optical axis. The aperture stop has a non-rotationally symmetrical (or asymmetrical) aperture through which the optical axis extends. Alignment elements are provided on the imaging lens assembly and are operative for aligning the non-rotationally symmetrical aperture with the imaging array.

Preferably, the imaging array is a linear imaging array that extends along an array axis, and the non-rotationally symmetrical (not circular) aperture, e.g., a rectangular or elliptical aperture, extends along an aperture axis. In this case, the alignment elements are operative for aligning the aperture axis to be generally perpendicular to the array axis. This improves the signal-to-noise ratio of an electrical signal generated by the imaging sensor, extends the range of the working distances in which the target can be imaged and read, and increases the overall reliability, performance, and responsiveness of the imaging reader.

The alignment elements advantageously include a keying element for keying the aperture stop to be fixed in a predetermined keyed position within the holder, and a turning element for turning the holder about the optical axis to be aligned in an aligned position relative to the imaging array. At least one of the lenses, or the aperture stop, or the holder is constituted of a plastic material to form a plastic component, and the keying element and/or the turning element are provided on the plastic component.

Also, preferably, one of the lenses is a plastic lens having opposite surfaces of substantially the same curvature and having substantially none of the optical power of the imaging lens assembly for optical aberration correction, and another of the lenses is a glass lens having opposite surfaces of different curvature and having substantially all of the optical power of the imaging lens assembly for thermal stability. This part-plastic, part-glass, hybrid lens design is compact and achieves the above-described dual advantages of glass and plastic in which the glass lens provides, among other things, thermal stability, and the plastic lens provides, among other things, not only a lighter weight and ease and expense of manufacture, but also enables the alignment elements to be readily integrated in the imaging lens assembly.

Turning now to the drawings, reference numeral 30 in FIG. 1 generally identifies an imaging apparatus or reader having a presentation area configured as a generally upright window 26 and a gun-shaped housing 28 supported by a base 32 for supporting the imaging reader 30 on a countertop. The imaging reader 30 can thus be used in a hands-free mode as a stationary workstation in which products are slid, swiped past, or presented to, the window 26, or can be picked up off the countertop and held in an operator's hand and used in a handheld mode in which the reader is moved, and a trigger 34 is manually depressed to initiate imaging of a target, especially one- or two-dimensional symbols, to be read at a working distance from the window 26. In another variation, the base 32 can be omitted, and housings of other configurations can be employed. For example, the housing can be configured as a vertical slot scanner having a generally vertically arranged, upright window, or as a flat-bed or horizontal slot scanner having a generally horizontally arranged window, or as a bi-optical, dual window scanner having both generally horizontally and vertically arranged windows, A cable, as illustrated in FIG. 1, connected to the base 32 can also be omitted, in which case, the reader 30 communicates with a remote host by a wireless link, and the reader 30 is electrically powered by an on-board battery.

Figure 2:
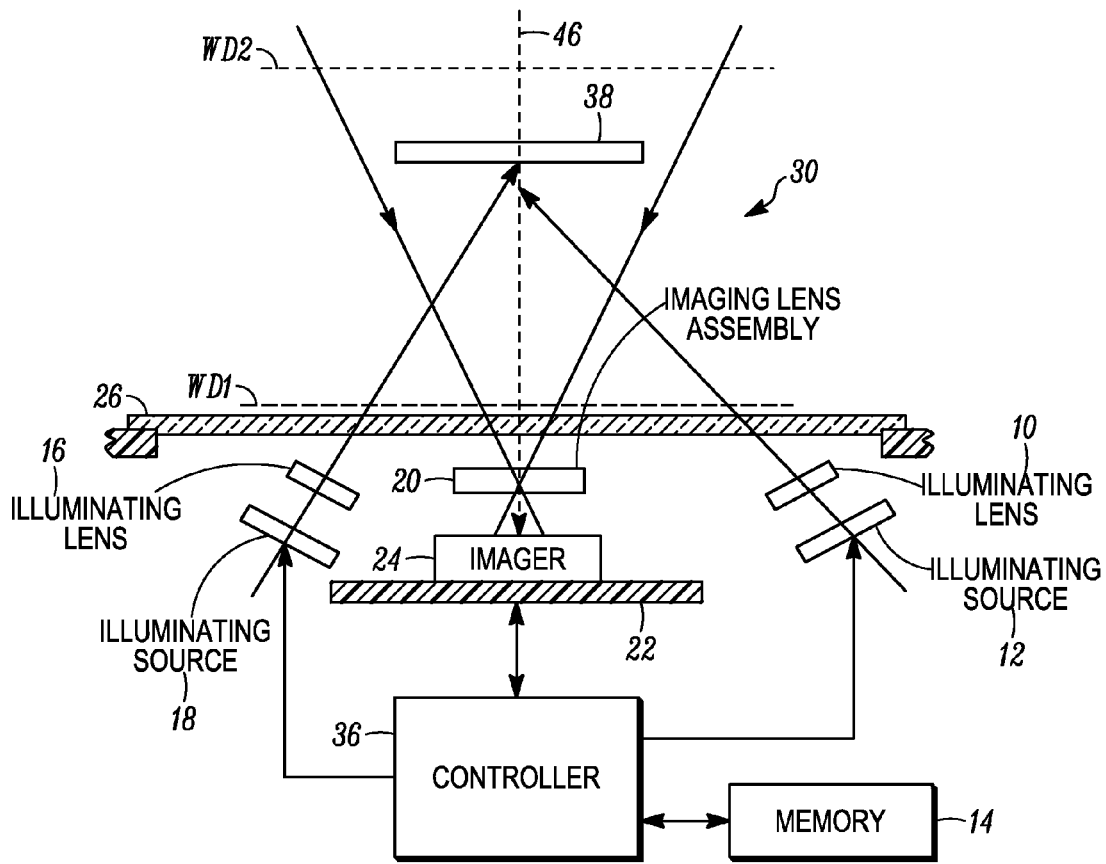
FIG. 2 is a schematic diagram of various components of the reader of FIG. 1.
Figure 3:
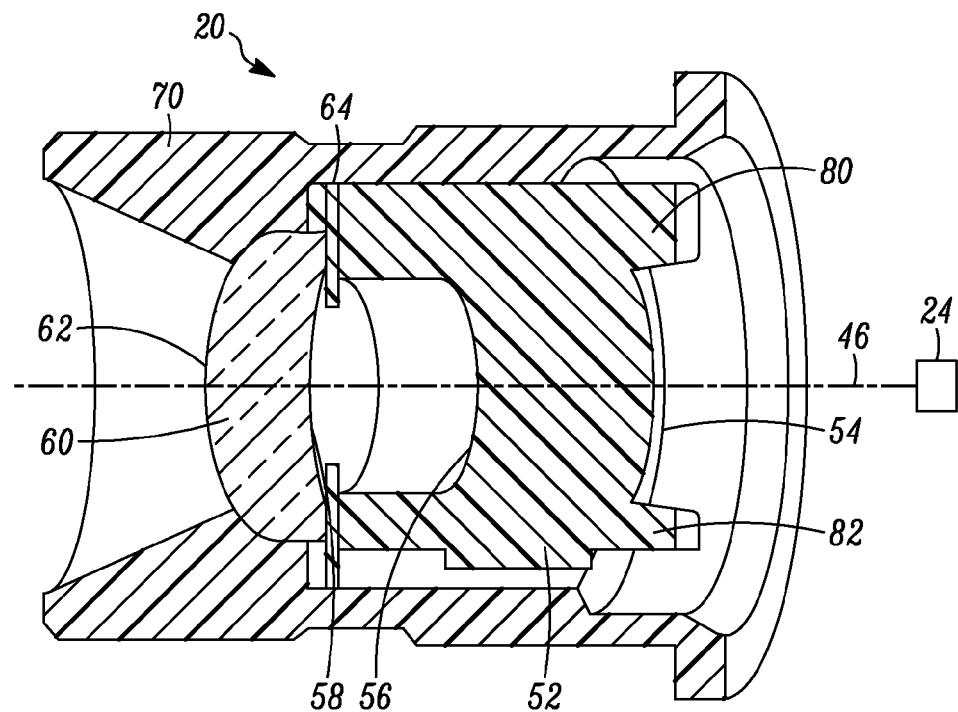
FIG. 3 is a part-sectional, part-isometric, cross-sectional view of an imaging lens assembly in accordance with a first embodiment of this invention for use in the reader of FIG. 1.
Figure 4:
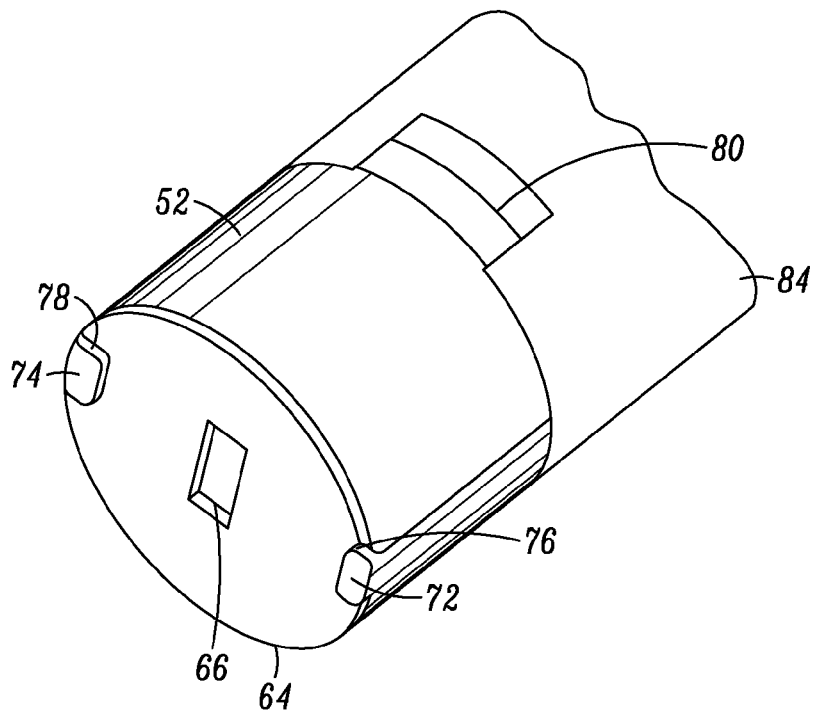
FIG. 4 is a perspective view of some of the components of the first embodiment of the imaging lens assembly of FIG. 3 during alignment.
Figure 5:
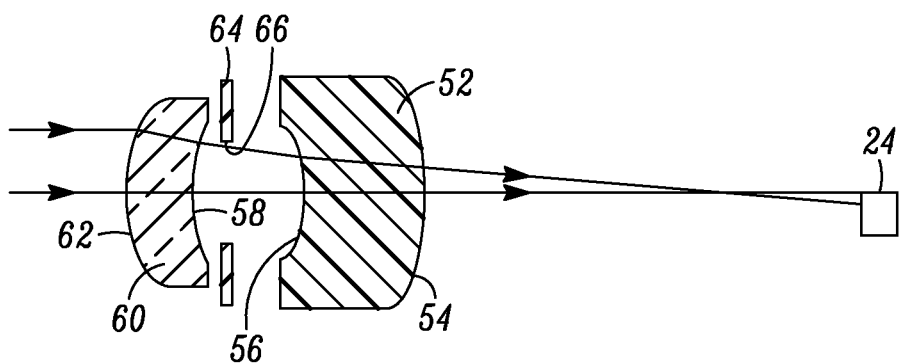
FIG. 5 is an exploded, diagrammatic side elevational view of the optical components of the first embodiment of the imaging lens assembly of FIG. 3 depicting ray traces.

As schematically shown in FIG. 2, an imager or imaging sensor 24 is mounted on a printed circuit board 22 in the reader. The imaging sensor 24 is a solid-state device, for example, a CCD or a CMOS imaging sensor having an array of addressable image sensors or pixels, preferably, but not necessarily, arranged in a single, linear, one-dimensional row along an array axis, and operative for detecting return light captured by an imaging lens assembly 20 along an optical path or optical axis 46 that extends through the window 26. The return light is scattered and/or reflected from a target or symbol 38 as pixel data over a field of view. The imaging lens assembly 20 is operative for focusing and projecting the return light onto the array of image sensors to enable the target 38 to be read. The target 38 is located anywhere in a range of working distances between a close-in working distance (WD1) and a far-out working distance (WD2). In a preferred embodiment, WD1 is about four to six inches from the imaging sensor 24, and WD2 can be many feet from the window 26, for example, around fifty feet away.

An illuminating assembly is also mounted in the imaging reader and preferably includes an illuminator or illuminating light sources 12, 18, e.g., light emitting diodes (LEDs), and corresponding illuminating lenses 10, 16 to uniformly illuminate the target 38 with an illuminating light having an intensity level over an illumination time period. The light sources 12, 18 are preferably pulsed.

As shown in FIG. 2, the imaging sensor 24 and the illuminating light sources 12, 18 are operatively connected to a controller or programmed microprocessor 36 operative for controlling the operation of these components. Preferably, the microprocessor 36 is operative for processing the return light from the target 38, and for decoding the captured target image when the target 38 is a symbol. A memory 14 is accessible by the controller 36 for storing and retrieving data.

In operation, the controller 36 sends a command signal to pulse the illuminating light sources 12, 18 for the illumination time period, say 500 microseconds or less, and energizes and exposes the imaging sensor 24 to collect light, e.g., illumination light and/or ambient light, from the target 38 during an exposure time period. A typical array needs about 16-33 milliseconds to acquire the entire target image and operates at a frame rate of about 30-60 frames per second.

Figure 10:
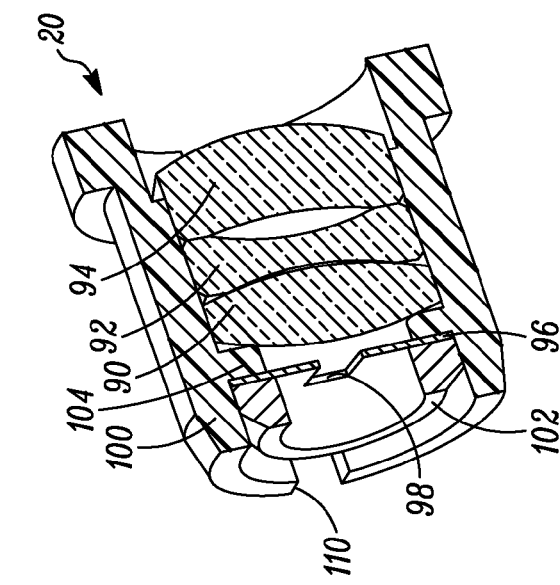
FIG. 10 is a part-sectional, part-isometric view of the second embodiment of the imaging lens assembly of FIG. 8, showing the keyed aperture stop and a set of lenses within a holder.
Figure 9:
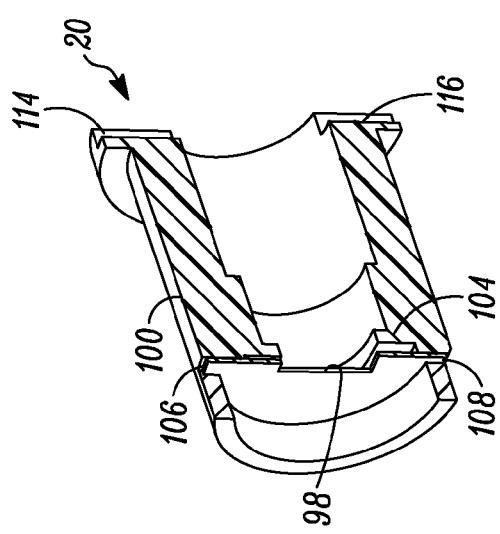
FIG. 9 is a part-sectional, part-isometric view of the second embodiment of the imaging lens assembly of FIG. 8, showing only an aperture stop keyed within a holder.
Figure 13:
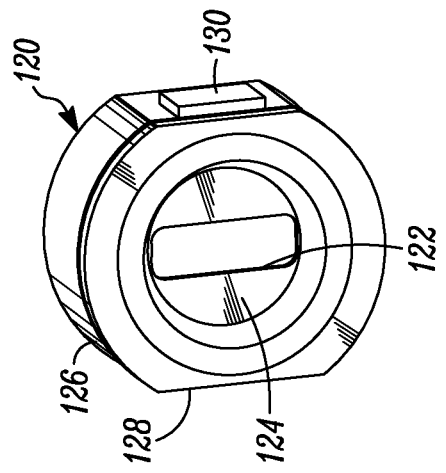
FIG. 13 is a perspective view in isolation of an aperture stop of the fourth embodiment of FIG. 12.
Figure 12:
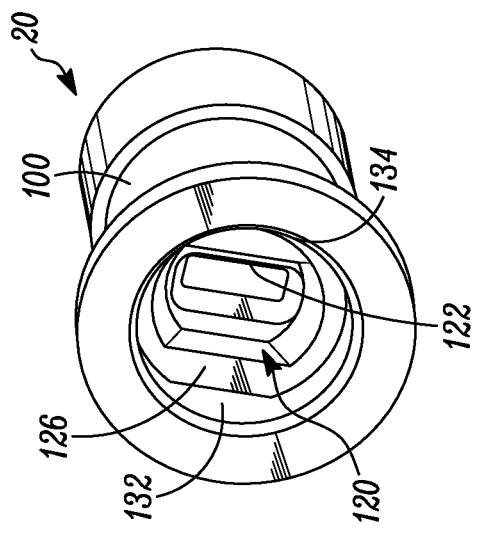
FIG. 12 is a perspective view of an imaging lens assembly in accordance with a fourth embodiment of this invention for use in the reader of FIG. 1.
Figure 11:
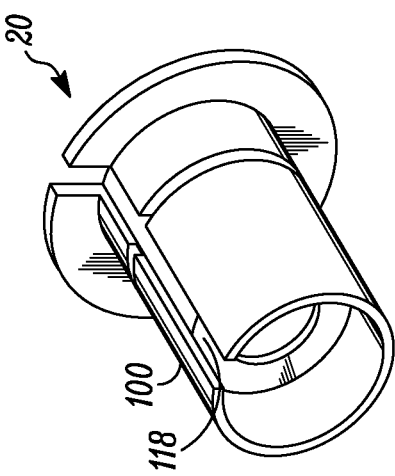
FIG. 11 is a perspective view of an imaging lens assembly in accordance with a third embodiment of this invention for use in the reader of FIG. 1.

FIGS. 3-7 depict a first embodiment of the imaging lens assembly 20 of this invention. FIGS. 8-10 depict a second embodiment. FIG. 11 depicts a third embodiment. FIGS. 12-13 depict a fourth embodiment. Each embodiment of the imaging lens assembly 20 is supported by the reader 30 and is operative for capturing return illumination light through the window 26 from the target 38 over the field of view, and for projecting the captured return illumination light onto the imaging sensor 24 during imaging and reading of the target 38. As described in detail below, each embodiment includes a plurality of all-glass, or all-plastic, or a hybrid combination of glass and plastic, lenses, an aperture stop, and a holder or optical barrel for holding the lenses and the aperture stop in axially spaced relation along an optical axis. The aperture stop has a non-rotationally symmetrical (or asymmetrical) aperture through which the optical axis extends. In accordance with this invention, alignment elements are provided on the imaging lens assembly for facilitating alignment between the non-rotationally symmetrical aperture and the imaging sensor 24.

In the first embodiment of FIGS. 3-7, the imaging lens assembly 20 includes a plastic lens 52 for optical aberration correction. Preferably, the plastic lens 52 has opposite nearly concentric surfaces 54, 56 of substantially the same curvature (see FIGS. 5-6) and has substantially virtually none of the optical power of the imaging lens assembly 20. The aspheric profile of the plastic lens 52 redistributes incoming light rays (see FIGS. 5-6) for better wavefront matching and improved image quality. The imaging lens assembly 20 also includes a glass lens 60 axially spaced away from the plastic lens 52 along the optical axis 46. The glass lens 60 has substantially virtually all of the optical power of the imaging lens assembly 20 for thermal stability. Preferably, the glass lens 60 has opposite surfaces 58, 62 (see FIGS. 5-6) of different curvature to bend the incoming light rays.

Figure 6:
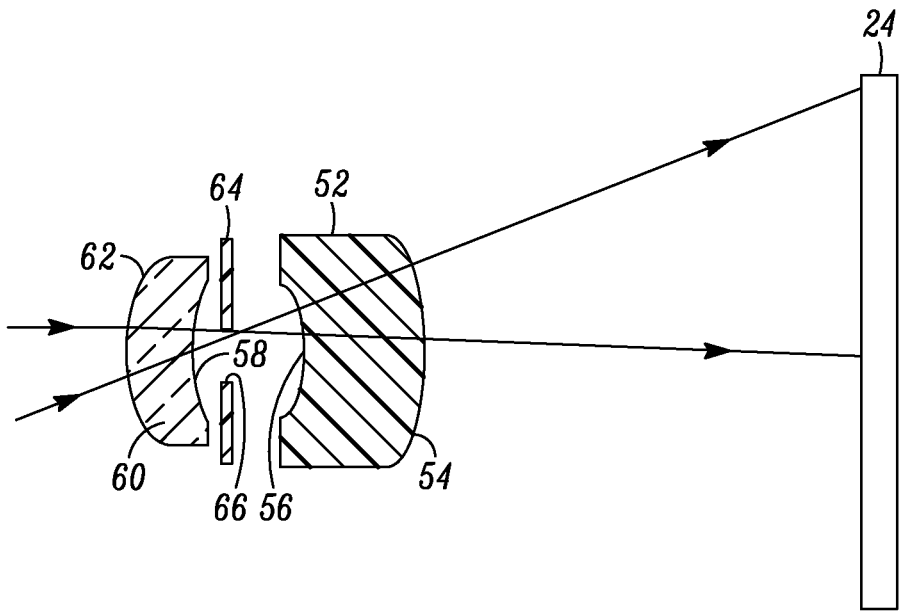
FIG. 6 is an exploded, diagrammatic top plan view of the optical components of the first embodiment of the imaging lens assembly of FIG. 3 depicting ray traces.

The hybrid imaging lens assembly 20 of FIGS. 3-7 further includes an aperture stop 64, preferably, but not necessarily, formed as a discrete optical component, between the lenses 52, 60. The aperture stop 64 has opaque walls bounding a non-rotationally symmetrical (or asymmetrical) aperture 66 (see FIG. 4), e.g., a rectangular or elliptical aperture, through which the optical axis 46 extends. A tubular, generally cylindrical holder 70 holds the lenses 52, 60 and the aperture stop 64 in axially spaced fixed relation along the optical axis 46 relative to the imaging sensor 24. The aperture stop 64 could also be made of one-piece with the holder 70. As detailed below, the alignment elements, which include both keying elements and turning elements, on the imaging lens assembly 20 are operative to align the non-rotationally symmetrical aperture 66 relative to the imaging sensor 24. Specifically, the longer dimension of the non-rotationally symmetrical aperture 66 extends along an aperture axis direction generally perpendicular to the elongation (or array axis) of the imaging sensor 24. Put another way, as shown in the side views of FIGS. 3 and 5, the longer dimension of the non-rotationally symmetrical aperture 66 is oriented to be parallel to the shorter dimension of the imaging sensor 24. As shown in FIG. 6, the shorter dimension of the non-rotationally symmetrical aperture 66 is oriented to be parallel to the longer dimension of the imaging sensor 24.

Figure 7:
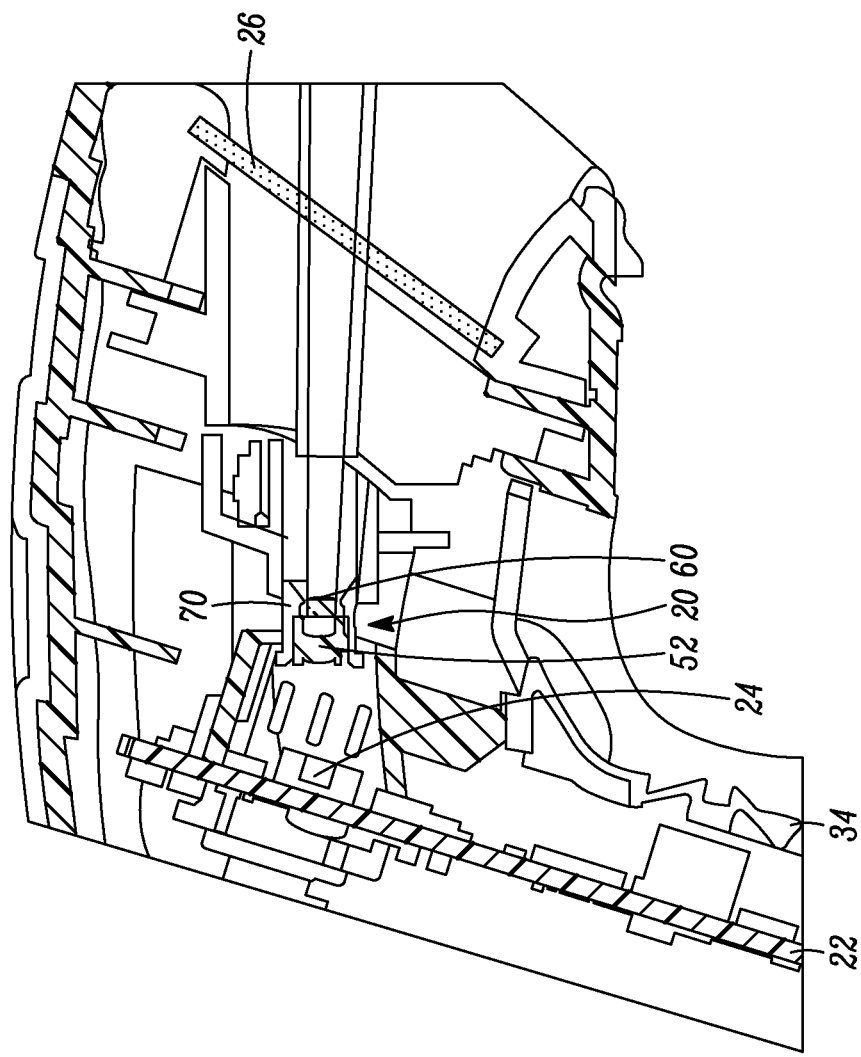
FIG. 7 is a broken-away view depicting the first embodiment of the imaging lens assembly of FIG. 3 in alignment with an imaging sensor in an imaging reader in accordance with this invention.
Figure 8:
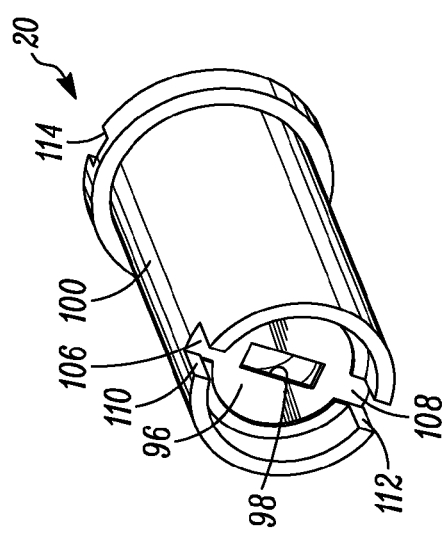
FIG. 8 is a perspective view of an imaging lens assembly in accordance with a second embodiment of this invention for use in the reader of FIG. 1.

In the first embodiment of FIGS. 3-7, the alignment elements include a first pair of molded keying elements or projections 72, 74 (see FIG. 4) formed on, and extending away from, one axial end face of the plastic lens 52. The keying projections 72, 74 are received in a pair of keying elements or cutouts 76, 78 formed in the aperture stop 64 to key the aperture stop 64 with the plastic lens 52. The cutouts 76, 78 straddle the aperture 66. The alignment elements further include a second pair of molded turning elements or extensions 80, 82 formed on, and extending away from, an opposite axial end face of the plastic lens 52 for engagement with a turning or alignment tool 84 (see FIG. 4) to turn and angularly align the plastic lens 52 with the linear imaging sensor 24. The lenses 52, 60 and the aperture stop 64 are all fixed in place, preferably with an adhesive bond, within the holder 70. When the turning tool 84 engages the plastic lens 52, the entire held assembly turns as a unit until proper angular alignment around the optical axis 46 is secured with the imaging sensor 24. FIG. 7 depicts the aligned assembly 20 relative to the imaging sensor 24 in a reader. The keying cutouts 76, 78 could equally well be formed in the plastic lens 52, in which case, the keying projections 72, 74 would be formed on the aperture stop 64. Similarly, the turning extensions 80, 82 need not be formed on the plastic lens 52, but could be formed on the tool 84. Again, since the lens 52 is a plastic component, the keying and/or turning elements are readily integrated thereon, for example, in a molding operation.

The hybrid assembly 20 of FIGS. 3-7 is part-glass and part-plastic. Since virtually all the optical power is configured in the glass lens 60, and virtually no optical power is configured in the plastic lens 52, the hybrid assembly 20 has better thermal stability and better resistance to focal shift with temperature variation as compared to an all-plastic lens assembly. The use of plastic lowers the size, weight and cost of the overall assembly and also lowers the number of optical components that comprise the assembly. In addition, the aperture 66 is placed between the glass lens 60 and the plastic lens 52, and provides optimum compensation of odd order aberrations (coma, astigmatism, distortion, etc.) since they tend to cancel each other. As a result, image distortion of less than 0.5% can be easily achieved. Image magnification stays nearly unchanged on and off the optical axis 46. Another benefit is that the physical size or diameter of the lenses 52, 60 can be minimized, thereby further reducing the overall weight and volume of the assembly 20 of FIGS. 3-7.

Turning now to the second embodiment of FIGS. 8-10, rather than the two hybrid lenses 52, 60 as in the first embodiment of FIGS. 3-7, a plurality of three lenses 90, 92 and 94, such as a Cooke triplet, is used. The lenses 90, 92 and 94 may be all glass, or all plastic, or a combination thereof. An aperture stop 96, preferably, but not necessarily, formed as a discrete optical component, is located outside the Cooke triplet, and not between any of the lenses as in the first embodiment of FIGS. 3-7. The aperture stop 96 has opaque walls bounding a non-rotationally symmetrical (or asymmetrical) aperture 98 (see FIG. 8), e.g., a rectangular or elliptical aperture. A tubular, generally cylindrical holder 100 holds the lenses 90, 92 and 94 and the aperture stop 96 in axially spaced fixed relation relative to the imaging sensor 24. A locking collar 102 is press-fit into the holder 100 to secure the aperture stop 96 in place against an internal annular shoulder 104 inside the holder 100. The aperture stop 96 could also be made of one-piece with the holder 100.

As described above, alignment elements, which include both keying elements and turning elements, are also provided on the second embodiment of the imaging lens assembly 20 of FIGS. 8-10, and are operative to align the non-rotationally symmetrical aperture 98 relative to the imaging sensor 24. The alignment elements include a first pair of molded keying elements or projections 106, 108 formed on, and extending radially away from, the aperture stop 96. The keying projections 106, 108 are received in a pair of keying elements or cutouts 110, 112 formed in the holder 100 to key the aperture stop 96 with the holder 100. The alignment elements further include a second pair of molded turning elements or slots 114, 116 (see FIG. 8) formed on the holder 100 for engagement with a turning or alignment tool to turn and angularly align the aperture 98 with the linear imaging sensor 24. When the turning tool engages the holder 100, the entire held assembly turns as a unit until proper angular alignment around the optical axis 46 is secured with the imaging sensor 24. Again, the keying and/or turning elements are provided on plastic components, e.g., the aperture stop 96 and/or the holder 100 and, therefore, they are readily integrated in the imaging lens assembly 20 of FIGS. 8-10, for example, in a molding operation.

Turning now to the third embodiment of FIG. 11, it is virtually identical to the second embodiment of FIGS. 8-10, except that a longitudinal channel 118 is formed along the entire length of the holder 100 in parallelism with the optical axis 46. One end of this channel 118 serves as one of the keying cutouts 110, 112 of the second embodiment. An opposite end of this channel 118 serves as one of the turning slots 114, 116 of the second embodiment.

Turning now to the fourth embodiment of FIGS. 12-13, reference numeral 120 identifies a discrete, relatively thick, plastic-molded, aperture stop, again having opaque walls bounding a non-rotationally symmetrical (or asymmetrical) aperture 122, e.g., a rectangular or elliptical aperture. In the first through third embodiments, the aperture stop is configured as a quite thin, generally planar disc, which is advantageous in obtaining a sharply defined edge for the aperture, to thereby realize improved optical performance, but can sometimes cause handling and assembly problems due to its thin, less stiff configuration. The aperture stop 120 of the fourth embodiment, however, is configured as a thicker, stepped component for better handling. A sharply defined edge for the aperture 122 is achieved by forming the aperture 122 in a very thin wall 124 within the aperture stop 120. The thin wall 124 is surrounded by an annular support 126.

The annular support 126 has a pair of generally planar, outer walls 128, 130 (see FIG. 13). The holder 100 has a pair of generally planar, inner walls 132, 134 (see FIG. 12). When the aperture stop 120 is inserted into the holder 100, the outer walls 128, 130 are in mutual direct surface area contact with the inner walls 132, 134 to fix the aperture stop 120 in a predetermined keyed position within the holder 100. Thus, these outer and inner walls serve as the keying elements described above.

It will be understood that each of the elements described above, or two or more together, also may find a useful application in other types of constructions differing from the types described above. For example, in any of the embodiments, the holder 100 need not be a separate component, but can be integrated or molded with another component of the reader, e.g., a support for the imaging sensor 24. In a variant construction, the alignment elements need not be molded from a plastic material, but could be made from other materials, such as metal. For example, if the older and/or the aperture stop is constituted of a metal material, then the alignment elements could br etched, stamped, or machined therefrom.

In accordance with another feature of this invention, a method of imaging a target, is performed by configuring an imaging lens assembly with a plurality of lenses and an aperture stop, to capture return light from the target over a field of view of an imaging array of image sensors of a solid-state imaging sensor, and to project the captured return light onto the imaging array during imaging of the target, by holding the lenses and the aperture stop in spaced relation in a holder along an optical axis, by configuring the aperture stop with a non-rotationally symmetrical aperture through which the optical axis extends, and by aligning the non-rotationally symmetrical aperture with the imaging array with alignment elements on the imaging lens assembly.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A reader for imaging a target, comprising:
a housing having a presentation area;
a solid-state imaging sensor supported by the housing and including an imaging array of image sensors looking at a field of view that extends through the presentation area to the target;
an imaging lens assembly supported by the housing, for capturing return light over the field of view from the target through the presentation area, and for projecting the captured return light onto imaging array during imaging of the target, the assembly including a plurality of lenses, an aperture stop, and a holder for holding the lenses and the aperture stop in spaced relation along an optical axis, the aperture stop having a non-rotationally symmetrical aperture through which the optical axis extends, and alignment elements on the imaging lens assembly for aligning the non-rotationally symmetrical aperture with the imaging array; and
wherein the alignment elements include a keying element for keying the aperture stop to be fixed in a predetermined keyed position within the holder, and a turning element for turning the holder about the optical axis to be aligned in an aligned position relative to the imaging array.

2. The reader of claim 1, wherein the array is a linear array extending along an array axis, wherein the non-rotationally symmetrical aperture extends along an aperture axis, and wherein the alignment elements are operative for aligning the aperture axis to be generally perpendicular to the array axis.

3. The reader of claim 1, wherein at least one of the lenses, the aperture stop and the holder is constituted of a plastic material to form a plastic component, and wherein the alignment elements are on the plastic component.

4. The reader of claim 1, wherein one of the lenses is a plastic lens having opposite surfaces of substantially the same curvature and having substantially none of the optical power of the imaging lens assembly for optical aberration correction, and wherein another of the lenses is a glass lens having opposite surfaces of different curvature and having substantially all of the optical power of the imaging lens assembly for thermal stability.

5. A reader for imaging a target, comprising:
a housing having a presentation area;
a solid-state imaging sensor supported by the housing and including an imaging array of image sensors looking at a field of view that extends through the presentation area to the target;
an imaging lens assembly supported by the housing, for capturing return light over the field of view from the target through the presentation area, and for projecting the captured return light onto the imaging array during imaging of the target, the assembly including a plurality of lenses, an aperture stop, and a holder for holding the lenses and the aperture stop in spaced relation along an optical axis, the aperture stop having a non-rotationally symmetrical aperture through which the optical axis extends, and alignment elements on the imaging lens assembly for aligning the non-rotationally symmetrical aperture with the imaging array;
wherein the aperture stop is a discrete optical component separate from the holder; and
wherein the alignment elements include a keying element for keying the aperture stop to be fixed in a predetermined keyed position within the holder; and wherein the keying element includes a plurality of keying projections on the aperture stop, and a plurality of keying cutouts on the holder; and wherein the keying projections are received in the keying cutouts in the keyed position.

6. A reader for imaging a target, comprising:
a housing having a presentation area;
a solid-state imaging sensor supported by the housing and including an imaging array of image sensors looking at a field of view that extends through the presentation area to the target;
an imaging lens assembly supported by the housing, for capturing return light over the field of view from the target through the presentation area, and for projecting the captured return light onto the imaging array during imaging of the target, the assembly including a plurality of lenses, an aperture stop, and a holder for holding the lenses and the aperture stop in spaced relation along an optical axis, the aperture stop having a non-rotationally symmetrical aperture through which the optical axis extends, and alignment elements on the imaging lens assembly for aligning the non-rotationally symmetrical aperture with the imaging array;
wherein the aperture stop is a discrete optical component separate from the holder; and
wherein the alignment elements include a keying element for keying the aperture stop to be fixed in a predetermined keyed position within the holder; and wherein the keying element includes a plurality of generally planar walls on the aperture stop, and a plurality of generally planar walls on the holder; and wherein the generally planar walls on the aperture stop and the holder are in mutual direct surface area contact in the keyed position.

7. A reader for imaging a target, comprising:
a housing having a presentation area;
a solid-state imaging sensor supported by the housing and including an imaging array of image sensors looking at a field of view that extends through the presentation area to the target;
an imaging lens assembly supported by the housing, for capturing return light over the field of view from the target through the presentation area, and for projecting the captured return light onto the imaging array during imaging of the target, the assembly including a plurality of lenses, an aperture stop, and a holder for holding the lenses and the aperture stop in spaced relation along an optical axis, the aperture stop having a non-rotationally symmetrical aperture through which the optical axis extends, and alignment elements on the imaging lens assembly for aligning the non-rotationally symmetrical aperture with the imaging array;
wherein at least one of the lenses and the holder is constituted of a plastic material to form a plastic component, and wherein the alignment elements include a turning element on the plastic component for turning the holder about the optical axis to be aligned in an aligned position relative to the imaging array; and
wherein the plastic component is the holder, and wherein the turning element is a slot formed in the holder for engagement with a turning tool.

8. A reader for imaging a target, comprising:
a housing having a presentation area;
a solid-state imaging sensor supported by the housing and including an imaging array of image sensors looking at a field of view that extends through the presentation area to the target;
an imaging lens assembly supported by the housing, for capturing return light over the field of view from the target through the presentation area, and for projecting the captured return light onto the imaging array during imaging of the target, the assembly including a plurality of lenses, an aperture stop, and a holder for holding the lenses and the aperture stop in spaced relation along an optical axis, the aperture stop having a non-rotationally symmetrical aperture through which the optical axis extends, and alignment elements on the imaging lens assembly for aligning the non-rotationally symmetrical aperture with the imaging array;
wherein at least one of the lenses and the holder is constituted of a plastic material to form a plastic component, and wherein the alignment elements include a turning element on the plastic component for turning the holder about the optical axis to be aligned in an aligned position relative to the imaging array; and
wherein the plastic component is the one lens, and wherein the turning element is a projection formed on the one lens for engagement with a turning tool.

9. A method of imaging a target, comprising:
configuring an imaging lens assembly with a plurality of lenses and an aperture stop, to capture return light from the target over a field of view of an imaging array of image sensors of a solid-state imaging sensor, and to project the captured return light onto the imaging array during imaging of the target;
holding the lenses and the aperture stop in spaced relation in a holder along an optical axis;
configuring the aperture stop with a non-rotationally symmetrical aperture through which the optical axis extends;
aligning the non-rotationally symmetrical aperture with the imaging array .with alignment elements on the imaging lens assembly; and
wherein the aligning is performed by keying the aperture stop to be fixed in a predetermined keyed position within the holder, and by turning the holder about the optical axis to be aligned in an aligned position relative to the imaging array.

10. The method of claim 9, and configuring the array as a linear array extending along an array axis, and configuring the non-rotationally symmetrical aperture to extend along an aperture axis, and wherein the aligning is performed by aligning the aperture axis to be generally perpendicular to the array axis.

11. The method of claim 9, and constituting at least one of the lenses, the aperture stop and the holder of a plastic material to form a plastic component, and providing the alignment elements on the plastic component.

12. The method of claim 9, and configuring the aperture stop as a discrete optical component separate from the holder.

13. The method of claim 9, wherein the turning is performed by engaging a turning tool with the imaging lens assembly.

14. The method of claim 9, configuring one of the lenses as a plastic lens having opposite surfaces of substantially the same curvature and having substantially none of the optical power of the imaging lens assembly for optical aberration correction, and configuring another of the lenses as a glass lens having opposite surfaces of different curvature and having substantially all of the optical power of the imaging lens assembly for thermal stability.

* * * * *